(12) United States Patent
Banerjea et al.

(10) Patent No.: US 9,256,247 B2
(45) Date of Patent: Feb. 9, 2016

(54) METHOD AND APPARATUS FOR COMMUNICATING TIME INFORMATION BETWEEN TIME AWARE DEVICES

(71) Applicant: MARVELL WORLD TRADE LTD., St. Michael (BB)

(72) Inventors: Raja Banerjea, Sunnyvale, CA (US); Donald Pannell, Cupertino, CA (US); Ken Kinwah Ho, San Jose, CA (US); Ken Yeung, Cupertino, CA (US); Mao Yu, San Jose, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 472 days.

(21) Appl. No.: 13/734,753

(22) Filed: Jan. 4, 2013

(65) Prior Publication Data
US 2013/0173950 A1 Jul. 4, 2013

Related U.S. Application Data

(60) Provisional application No. 61/582,953, filed on Jan. 4, 2012, provisional application No. 61/708,866, filed on Oct. 2, 2012.

(51) Int. Cl.
*G06F 1/12* (2006.01)
*H04J 3/06* (2006.01)
*G06F 1/04* (2006.01)
(52) U.S. Cl.
CPC .. *G06F 1/12* (2013.01); *G06F 1/04* (2013.01); *H04J 3/0664* (2013.01); *H04J 3/0667* (2013.01)
(58) Field of Classification Search
CPC ............ G06F 1/12; G06F 1/04; H04J 3/0664; H04J 3/0667
See application file for complete search history.

(56) References Cited

U.S. PATENT DOCUMENTS 6,327,274 B1* 12/2001 Ravikanth ...................... 370/516
6,658,025 B2* 12/2003 Mauritz et al. ................. 370/507
2007/0147562 A1* 6/2007 Eidson .......................... 375/354
(Continued)

FOREIGN PATENT DOCUMENTS

DE 10 200802639 A1 12/2009
EP 2254267 A1 11/2010
WO WO-2012/065823 A1 5/2012

OTHER PUBLICATIONS

International Preliminary Report on Patentability in corresponding PCT/IB2013/000319 dated Jul. 17, 2014 (8 pages).
(Continued)

*Primary Examiner* — Stefan Stoynov (57) ABSTRACT

According to one embodiment, an apparatus includes a first processing unit operating according to a first clock, a second processing unit operating according to a second clock running separately from the first clock, and a synchronization controller coupled to the first communication unit and the second communication unit. The synchronization controller is configured to (i) cause the first communication unit to generate a first indication of time at which the first processing unit transmits a signal to the second processing unit, according to the first clock, (ii) cause the second processing unit to generate a second indication of time at which the second processing unit receives the signal, according to the second clock, and (iii) determine an offset between the first clock and the second clock based on the first indication of time and the second indication of time.

19 Claims, 7 Drawing Sheets

(56) References Cited

U.S. PATENT DOCUMENTS

| | | |
|---|---|---|
| 2008/0080567 A1 | 4/2008 | Radulescu |
| 2009/0052431 A1* | 2/2009 | Kroener et al. ............... 370/350 |
| 2011/0276648 A1 | 11/2011 | Soldan |

OTHER PUBLICATIONS

Gunnam, et al., "Multi-Rate Layered Decoder Architecture for Block Ldpc Codes of the IEEE 802.11n Wireless Standard," IEEE International Symposium on Circuits and Systems, 2007 (ISCAS 2007), pp. 1645-1648 (2007).

IEEE Std 802.11vTM/D14.0 "Draft Standard for Information technology—Telecommunications and information exchange between systems—Local and metropolitan area networks—Specific requirements" Part 11: Wireless LAN Medium Access Control (MAC) and Physical Layer (PHY) specifications, Amendment 8: IEEE 801.11 Wireless Network Management *The Institute of Electrical and Electronics Engineers, Inc.*, (Aug. 2010).

802.1AS—"Timing and Synchronization," *The Institute of Electrical and Electronics Engineers, Inc.*, Jul. 14, 2006.

IEEE Std 802.3afTM "IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications, Amendment: Data Terminal Equipment (DTE) Power via Media Dependent Interface (MDI)," IEEE Computer Society, *The Institute of Electrical and Electronics Engineers, Inc.*, (Jun. 2003).

International Search Report issued in corresponding Int'l App. No. PCT/IB2013/000319, mailed on Jun. 24, 2013.

Written Opinion issued in corresponding Int'l App. No. PCT/IB2013/000319, mailed on Jun. 24, 2013.

Mills, "Internet Time Synchronization: The Network Time Protocol," Network Working Group Request for Comments, No. 1129, Oct. 1989.

Mizrahi, "Slave Diversity: Using Multiple Paths to Improve the Accuracy of Clock Synchronization Protocols," 2012 IEEE Int'l Symposium on Precision Clock Synchronization for Measurement, Control, and Communication (ISPCS), Sep. 24, 2012.

Shpiner et al., "Multi-Path Time Synchronization," Internet Engineering Task Force (IETF), Oct. 15, 2012.

IEEE Std 802.11e/D11.0, "IEEE Standard for Information technology—Telecommunications and information exchange between systems-Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, Oct. 2004.

IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.*, May 25, 2007.

Abstract of IEEE 802.1AS Standard, "802.1AS—Timing and Synchronization," *The Institute of Electrical and Electronics Engineers, Inc.*, available at <http://www.ieee802.org/1/pages/802.1as.html>, (Nov. 11, 2010).

IEEE P1588TM D2.2 "Draft Standard for a Precision Clock Synchronization Protocol for Networked Measurement and Control Systems," *The Institute of Electrical and Electronics Engineers, Inc.*, 2008.

IEEE Std. 1588™-2008 (Revision of IEEE Std. 1588-200), "IEEE Standard for a Precision Clock Synchronization Protocol for Networked Measurement and Control Systems," *The Institute for Electrical and Electronics Engineers, Inc.*, IEEE Standard, Jul. 2008.

D. Mills, et al., "Network Time Protocol Version 4: Protocol and Algorithms Specification," Request for Comments: 5905, *Internet Engineering Task Force (IETF)*, Jun. 2010.

R. Zarick, et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140, Sep. 27-Oct. 1, 2010.

A. Mukherjee, "On the Dynamics and Significance of Low Frequency Components of Internet Load," University of Pennsylvania, 1992.

V. Paxson, "End-to-End Internet Packet Dynamics," SIGCOMM, 1997.

G. Appenzeller, et al., "Sizing router buffers," SIGCOMM, 2004.

M. Alizadeh, et al., "DCTCP: Efficient packet transport for the commoditized data center," SIGCOMM, 2010.

A. Abdul, et al., "Integration of HSR and IEEE1588 over Ethernet networks," Proc. of the 2010 Int'l IEEE Symposium on Precision Clock Synchronization for Measurement, Control and Communication, pp. 77-82, Sep. 27-Oct. 1, 2010.

O. Gurewitz, et al., "One-Way Delay Estimation Using Network Wide Measurements," IEEE Trans. on Information Theory, vol. 52, No. 6, pp. 2710-2724, 2006.

O. Gurewitz, et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044, Apr. 2001.

S. Lee, "An Enhanced IEEE 1588 Time Synchronization Algorithm for Asymmetric Communication Link Using Block Burst Transmission", IEEE Communications Letters, vol. 12, No. 9, pp. 687-689, Sep. 2008.

S. Lv, et al., "An Enhanced IEEE 1588 Time Synchronization for Asymmetric Communication Link in Packet Transport Network," IEEE Communications Letters, vol. 14. No. 8. pp. 764-766, Aug. 2010.

N. Simanic, et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24, Sep. 2011.

A. Corlett, et al. "Statistics of One Way Internet Packet Delays", Internet Engineering Task Force, available at http://tools.ietf.org/id/draft-corlett-statistics-of-packet-delays-00.txt, Aug. 2002.

Zhang, et al., "PDV-based PTP LSP Setup, Reoptimization and Recovery," Internet Engineering Task Force, Oct. 2011.

W. Chin, et al., "IEEE 1588 Clock Synchronization using Dual Slave Clocks in a Slave," IEEE Communications Letters, vol. 13, No. 6, pp. 456-458, Jun. 2009.

ITU-T Recommendation G.8265.1/Y.1365.1, "Precision time protocol telecom profile for frequency synchronization," *Int'l Telecommunication Union*, Oct. 2010.

IEEE Std. C37.238TM-2011, "IEEE Standard Profile for Use of IEEE 1588TM Precision Time Protocol in Power System Applications," *Institute for Electrical and Electronics Engineers, Inc.*, Jul. 2011.

IEC 62439-3, "Industrial communication networks—High availability automation networks—Part 3: Parallel Redundancy Protocol (PRP) and High-availability Seamless Redundancy (HSR)," *International Electrotechnical Commission*, 2010.

K. Weber, et al., "High availability seamless automation ring (Draft IEC 62439-3) and IEEE 1588 time sync dependencies," *Institute for Electrical and Electronics Engineers, Inc.*, Oct. 2010.

IEEE Std. 1588™-2008 (Revision of IEEE Std. 1588-2002), "IEEE Standard for a Precision Clock Synchronization Protocol for Networked Measurement and Control Systems," *The Institute for Electrical and Electronics Engineers, Inc.*, IEEE Standard, pp. 1-289 (Jul. 24, 2008).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN (56) References Cited

OTHER PUBLICATIONS

Medium Access Control (MAC) and Physical Layer (PHY) specifications, *The Institute of Electrical and Electronics Engineers, Inc.*, pp. 1-2695 (Mar. 29, 2012).

IEEE Std. 802.11n™ "IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

Aldana et al., IEEE P802.11—Wireless LANs, "CIDs 46,47,48 Regarding Fine Timing Measurement," *The Institute of Electrical and Electronics Engineers, Inc.*, doc.: IEEE 802.11 11-12-1249-04-000m, pp. 1-17 (Jan. 2013).

\* cited by examiner

METHOD AND APPARATUS FOR COMMUNICATING TIME INFORMATION BETWEEN TIME AWARE DEVICES

CROSS-REFERENCES TO RELATED APPLICATIONS

This disclosure claims the benefit of U.S. Provisional Patent Application No. 61/582,953, filed on Jan. 4, 2012, and U.S. Provisional Patent Application No. 61/708,866, filed on Oct. 2, 2012, both titled "Wireless AVB Requirements." The disclosures of both of these applications are incorporated herein by reference.

FIELD OF THE DISCLOSURE

The present disclosure relates generally to communication devices and, more particularly, to synchronizing communication devices or components of communication devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When communication devices exchange data over wired or wireless communication channels, the medium through which the data propagates, as well as processing at intermediate or endpoint communication devices, introduce various propagation delays to the data exchange. For example, an Ethernet link connecting a pair of communication devices typically delays a communication frame by several microseconds, and the propagation delay generally depends on the length of the Ethernet link. On the other hand, a network router that receives a frame, processes the received frame, and further transmits the frame can introduce a much longer delay, typically measured in milliseconds.

Some communication protocols specify techniques for transmitting time stamp information for data units. However, a transmitting device and a receiving device may have clocks that were started at different times and that run at different rates. Accordingly, standards have been developed to allow communication devices to exchange timing and synchronization information. In particular, the Institute for Electrical and Electronics Engineers (IEEE) 802.1AS Standard specifies a protocol and procedures for synchronizing Local Area Networks (LANs). Today, Ethernet ports are synchronized using the IEEE 802.1AS Standard and the IEEE 802.3af ("Power over Ethernet") Standard. As another example, wireless ports are synchronized using the IEEE 802.1AS Standard and the IEEE 802.11v Standard, which specifies configuration techniques for client devices connected to wireless networks.

SUMMARY

In an embodiment, an apparatus includes a first processing unit operating according to a first clock, a second processing unit operating according to a second clock running separately from the first clock, and a synchronization controller coupled to the first communication unit and the second communication unit. The synchronization controller is configured to (i) cause the first communication unit to generate a first indication of time at which the first processing unit transmits a signal to the second processing unit, according to the first clock, (ii) cause the second processing unit to generate a second indication of time at which the second processing unit receives the signal, according to the second clock, and (iii) determine an offset between the first clock and the second clock based on the first indication of time and the second indication of time.

In various implementations, one or more of the following features may be included. The apparatus may include a generic interface via which the first communication unit transmits the signal to the second communication unit. The generic interface may include one or more of (i) a General Purpose Input/Output (GPIO) pin, (ii) a Peripheral Component Interconnect Express (PCIE) port, or (iii) a Secure Digital Input Output (SDIS) slot. The signal may be a pulse. The synchronization controller may be configured to periodically repeat operations (i) and (ii) to determine a difference in frequency between the first clock and the second clock. The first processing unit may be one of (i) a wired communication unit configured to receive and transmit data via a wired communication link and (ii) a wireless communication unit configured to receive and transmit data via a wireless communication link, the second processing unit may be the other one of the wired communication unit and the wireless communication unit, and the apparatus may be configured to forward data between the wired communication unit and the wireless communication unit. The wired communication link may be an Ethernet link. The apparatus may include a first hardware register coupled to the first processing unit and to the synchronization controller to store the first indication of time, and a second hardware register coupled to the second processing unit and to the synchronization controller to store the second indication of time.

Another embodiment is a synchronization method in a device that includes (i) a first processing unit operating according to a first clock and (ii) a second processing unit operating according to a second clock running separately from the first clock. The method includes causing the first processing unit to generate a first indication of time at which the first processing unit transmits a signal to the second processing unit, according to the first clock. Further, the method includes causing the second processing unit to generate a second indication of time at which the second processing unit receives the signal, according to the second clock. Still further, the method includes determining an offset between the first clock and the second clock based on the first indication of time and the second indication of time.

In various implementations, one or more of the following features may be included. The method may include causing the first processing unit to transmit the signal via one of a General Purpose Input/Output (GPIO) pin, (ii) a Peripheral Component Interconnect Express (PCIE) port, or (iii) a Secure Digital Input Output (SDIS) slot. The method may include causing the first processing unit to transmit the signal in the form of a pulse. The signal may be associated with a command transmitted between the first processing unit and the second processing unit, where the command conforms to a messaging protocol defined for exchanging control information between the first processing unit and the second processing unit. The method may include causing the first processing unit to generate the signal as one of a plurality of signals, generating multiple versions of the first indication of time and the second indication of time using the plurality of signals, and determining a difference in frequency between the first clock and the second clock based on the multiple versions of the first indication of time and the second indication of time. The first processing unit may be a first communication unit and the second processing unit may be a second communication unit, and the method may include receiving a data packet via a port of the first communication unit, determining a propagation delay associated with the device using the determined offset and the determined difference in frequency, and transmitting the data packet via a port of the second communication unit, including providing an indication of the propagation delay. The first communication unit may be one of a wired communication unit and a wireless communication unit, and the second communication unit may be the other of the wired communication unit and the wireless communication unit.

In yet another embodiment, a processing is configured to operate in a device that includes the processing unit as a first processing unit, a second processing unit, and a synchronization controller coupled to the first processing unit and the second processing unit. The processing unit includes a clock according to which the first processing unit operates, where the second processing unit operates according to a separate clock, and an interface via which the first processing unit is coupled to the second processing unit. The processing unit is configured to (i) transmit a periodic signal to the second processing unit via the interface, and (ii) generate a first indication of time at which the first processing unit transmits the periodic signal to the second processing unit, according to the first clock. The synchronization controller is configured to (i) cause the second processing unit to generate a second indication of time at which the second processing unit receives the periodic signal, according to the second clock, and (ii) generate a synchronization parameter based on the first indication of time and the second indication of time.

In various implementations, one or more of the following features may be included. The interface may include one of (i) a General Purpose Input/Output (GPIO) pin, (ii) a Peripheral Component Interconnect Express (PCIE) port, or (iii) a Secure Digital Input Output (SDIS) slot. The periodic signal may be a pulse. The synchronization parameter may include at least one of (i) an offset between the clock of the first processing unit and the clock of the second processing unit and (ii) a difference in frequency between the clock of the first processing unit and the clock of the second processing unit. The first processing unit may be one of (i) a wired communication unit configured to receive and transmit data via a wired communication link and (ii) a wireless communication unit configured to receive and transmit data via a wireless communication link, and the second processing unit may be the other one of the wired communication unit and the wireless communication unit.

DETAILED DESCRIPTION

In embodiments described below, a device including multiple processing units that have separate and mutually independent sources of periodic timing signals (for simplicity, separate "clocks") efficiently synchronizes the processing units using a simple interface. The device determines one or more synchronization parameters such as the difference in offset and, if necessary, the difference in frequency between the clocks. Using the synchronization parameters, the device can accurately measure the propagation delay through the device and/or adjust the local value of a "grandmaster" clock at one of the processing units, for example. In some embodiments, some or all of the processing units operating in a device are communication units, such as network processors, wireless receivers and transmitters, etc.

When a packet arrives at a port of one communication unit operating in a device and departs via a port of another communication unit operating in the same device, the device can include in the packet an indication of propagation delay for the device, or otherwise notify other devices that receive and/or transmit the packet of the propagation delay. Time-aware devices then can use this indication of time to properly process the packet. For example, time-aware media processors can use this indication of time to synchronize video and audio provided via a display and speakers, respectively, in an Audio/Video Bridging (AVB) application.

In an example embodiment, the device includes a pair of communication units that receive and/or transmit packets via respective communication ports, a processor, and a generic interface via which the two communication units are connected. The generic interface can include General Purpose Input Output (GPIO) pins, for example. The communication units have separate clocks. To synchronize the communication units, a synchronization controller (which may be implemented in software, in the processor, in one or both communication units, or separately from the processor and the communication units) causes the first communication unit to transmit a pulse to the second communication unit via the generic interface and generate an indication of time at which the pulse is transmitted according to the clock of the first communication unit. The synchronization controller also causes the second communication unit to generate an indication of time at which the pulse is received according to the clock of the second communication unit. The distance between the two communication units is sufficiently small so as to render the propagation delay of the generic interface negligible. For example, this propagation delay can be only several nanoseconds long. Accordingly, the synchronization controller can determine the time difference between the first communication unit and the second communication unit using the two indications of time. For example, the synchronization controller can determine the Time of Day (ToD) of each communication unit and compute the "DC offset" between the communication units by subtracting one ToD value from the other ToD value.

Further, in some embodiments, the device performs the procedure described above multiple times (e.g., once per second). Using multiple time stamps, the synchronization controller calculates the difference in count frequencies of the two communication units. For example, if the two communication units use crystal oscillators (or simply "crystals"), the synchronization controller in this manner calculates the parts-per-million (PPM) difference. The device then calculates the propagation delay using the PPM difference and the DC offset, according to an embodiment.

According to one embodiment, the first communication unit is a wired communication unit that receives and/or transmits packet via one or several Ethernet ports, and the second communication unit is a wireless communication unit that receives and/or transmits packet via one or several wireless ports. In another embodiment, the first communication unit is a wireless communication unit, and the second communication unit is a wired communication unit. More generally, the communication units can be of any type, and the pulse can travel from any communication unit to any other communication unit in the device.

Figure 1:
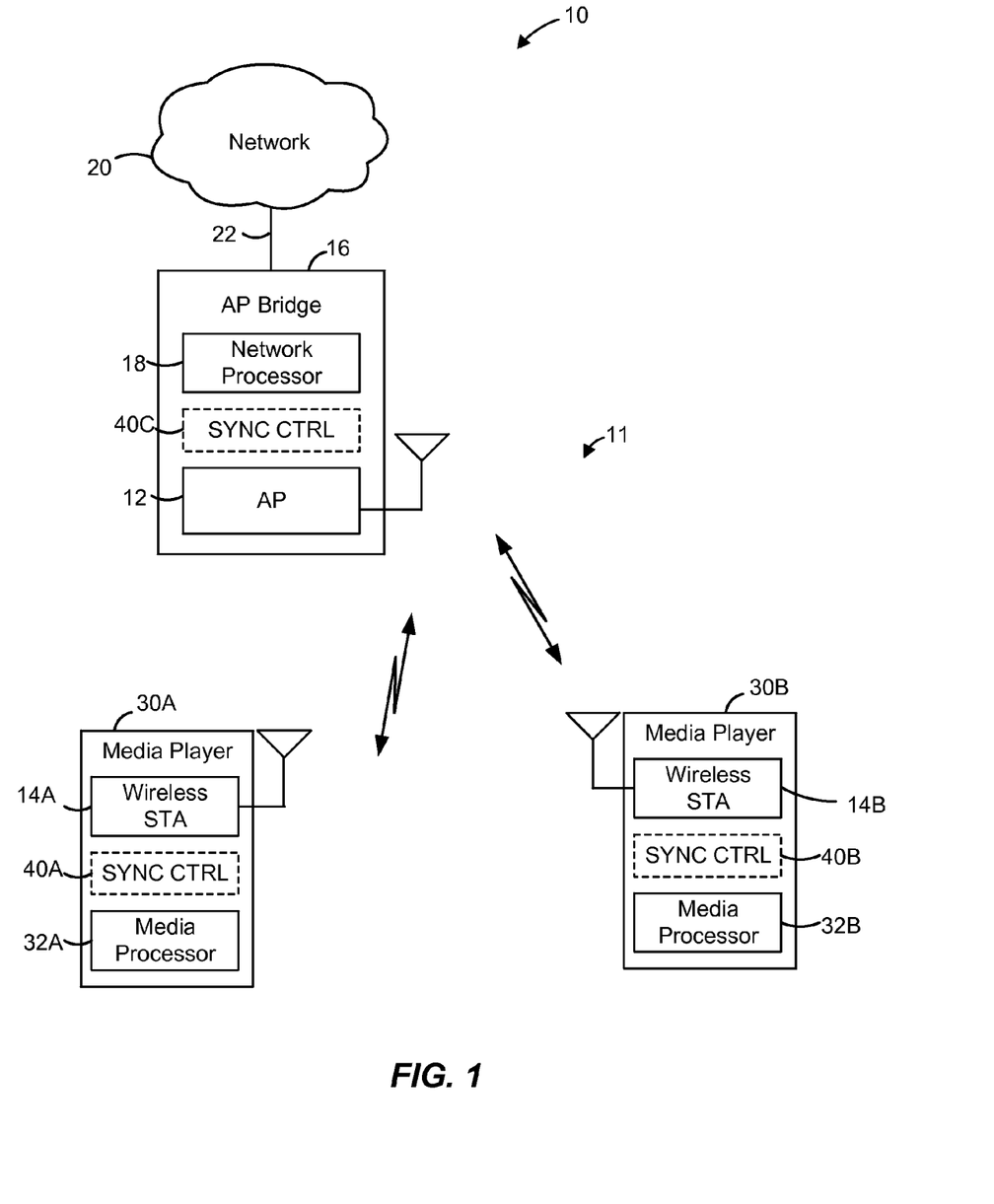
FIG. 1 is a block diagram of an example communication system in which one or more devices implement one or more synchronization techniques of the present disclosure, according to an embodiment.

To better illustrate the techniques of the present disclosure, FIG. 1 depicts an example communication system 10 in which an access point (AP) 12 operates in a wireless local area network (WLAN) 11 that includes client stations 14A and 14B. The AP 12 is a component of an AP bridge device 16 that includes a network processor 18. Using the network processor 18, the AP bridge device 16 communicates with devices operating in a communication network 20 via a wired communication link 22. The AP 12 and the network processor 18 operate according to different, mutually independent clocks. In an embodiment, the wired communication link 22 is an Ethernet link. Further, in an embodiment, the WLAN 11 operates according to the IEEE 802.11n standard.

The client station 14A operates in a media player 30A. The media player 30A also includes a media processor 32A via which the media player 30A provides media output such as video, for example. The components 14A and 32A can be disposed within the same housing. The client station 14B operates in a media player 30B that also includes a media processor 32B. The components 14B and 32B also can be disposed within the same housing. The media player 30B can provide audio output using the media processor 32B, for example. In an embodiment, the wireless station 14A and the media processor 32A operate according to different, mutually independent clocks. Similarly, in an embodiment, the wireless station 14B and the media processor 32B operate according to different, mutually independent clocks.

Each of the devices 30A, 30B, and 16 includes a synchronization controller 40, implemented according to at least some of the techniques of the present disclosure, to synchronize the corresponding processing units. More particularly, the synchronization controller 40A operates in the media player 30A to synchronize the wireless station 14A with the media processor 32A; the synchronization controller 40B operates in the media player 30B to synchronize the wireless station 14B with the media processor 32B; and the synchronization controller 40C operates in the AP bridge 16 to synchronize the network processor 18 with the AP 12. It is noted that the synchronization controller 40 can synchronize a pair of communication units operating in the same device (e.g., the AP bridge 16) as well as a communication unit and a processing unit operating in the same device (e.g., the media player 30A or 30B). More generally, the synchronization controller 40 can be used to synchronize any number of communication units and/or processing units.

As discussed in more detail below, the synchronization controller 40 can be implemented using hardware, software, firmware, or any suitable combination of hardware, software, and firmware. In an embodiment, the synchronization controller 40, the interface between the corresponding pair of processing units (e.g., the AP 12 and the network processor 18), buffers that store time stamps, etc., define a low-cost time application interface (TAI) that allows processing units operating in the same device but according to different clocks to be easily and reliably synchronized. Before considering an example TAI in more detail, however, example propagation of a data unit via several devices, including a device that implements at least some of the techniques of the present disclosure, is discussed with reference to FIG. 2.

Figure 2:
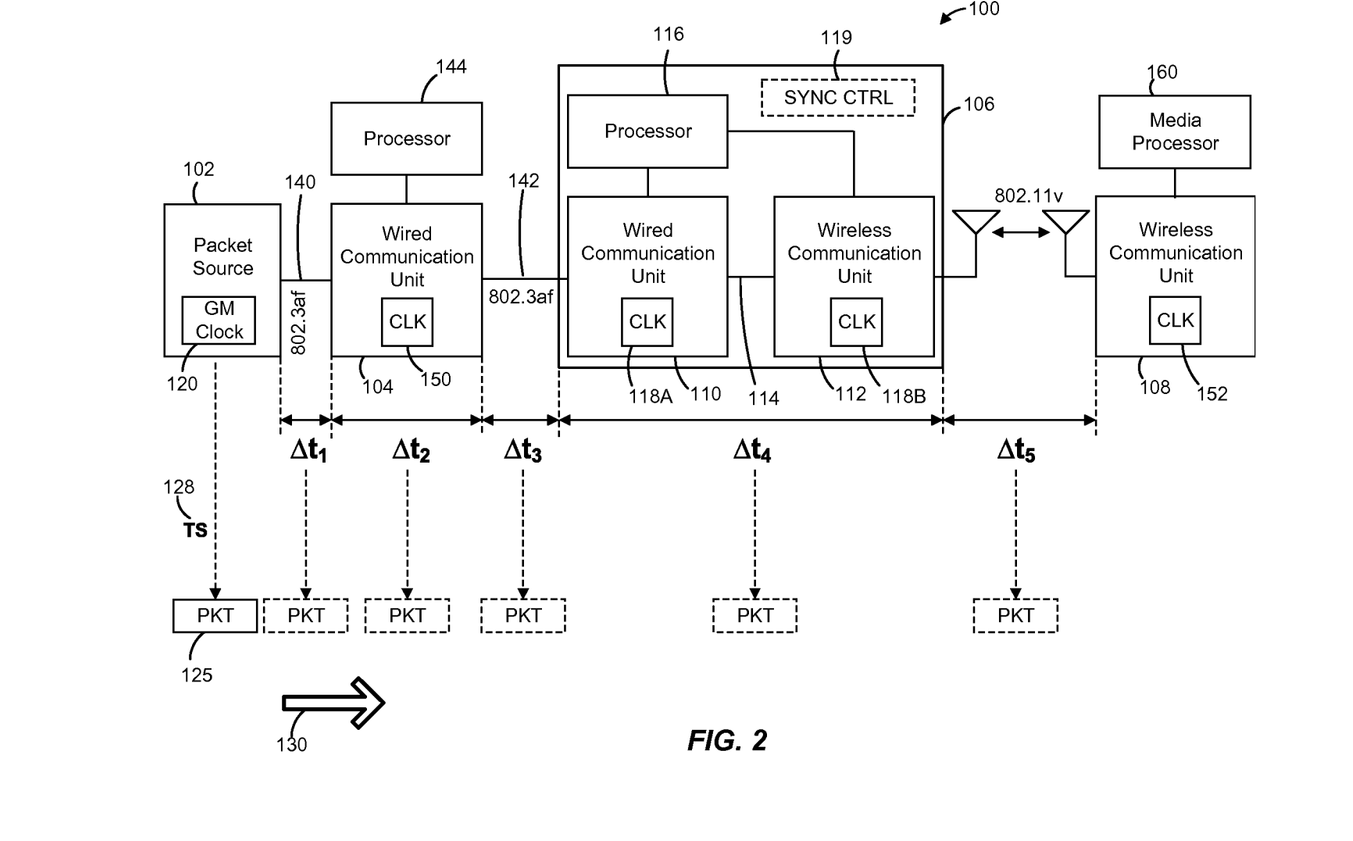
FIG. 2 is a diagram that illustrates example propagation of a data unit via several devices, including a device that can operate in the communication system of FIG. 1, according to an embodiment.

An example communication pipeline 100 of FIG. 2 includes a packet source 102 coupled in a wired manner to a communication unit 104, which in turn is coupled to a communication device 106 in a wired manner. The communication device 106 is also coupled to a wireless communication unit 108 in a wireless manner. In an example embodiment, the wireless communication unit 108 is a "consumer" of data packets transmitted from the packet source 102 via the devices 104 and 106. In other words, the components 102 and 108 define the endpoints of a communication pipeline 100.

Similar to the AP bridge 16 discussed with reference to FIG. 1, the communication device 106 includes a wired communication unit 110 and a wireless communication unit 112, coupled to the wired communication unit 110 via an interface 114. The communication device 106 can operate as a router or a bridge device, for example, and can route or forward data between the communication units 110 and 112, in an embodiment. The communication device 106 also includes a processor 116 communicatively coupled to the wired communication unit 110 and the wireless communication unit 112. In an embodiment, the communication units 110 and 112 include clocks 118A and 118B, respectively. More generally, the communication units 110 and 112 can receive periodic timing signals from separate, independent sources, which may be provided as components of the communication units 110 and 112 or separately from the communication units 110 and 112. For example, in one such embodiment, the wired communication unit 110 does not include its own clock and operates according to the clock of the processor 116, while the wireless communication unit 112 operates according to the clock 118B. The communication device 106 includes a synchronization controller 119 implemented as a separate component or several components in the processor 116, the wired communication unit 110, and/or the wireless communication units 112.

In an embodiment, the wireless communication unit 108 operates as a component of a time-aware device or in a time-aware application mode. The packet source 102 in this case includes a "grandmaster" clock 120 that corresponds to the only "correct" time in the pipeline 100. The clock 120 may run at a different frequency and have a different start time than the other clocks in the pipeline 100. Moreover, devices in the pipeline 100 may operate at different temperatures. For example, the packet source 102 may be placed in a hotter place than the wired communication unit 104. As is known, temperature may affect the operation of a typical crystal oscillator.

In operation, the packet source 102 generates a packet 125 and includes a timestamp 128, generated using the grandmaster clock 120, in the header of the packet 125, according to an embodiment. As the packet 125 travels in the direction generally indicated by arrow 130 toward the wireless communication unit 108, the packet 125 encounters delays of various duration. To properly process the packet 125, the wireless communication unit 108 attempts to determine the propagation delay via the pipeline 100 with as much precision as possible. To this end, non-negligible delays via the intermediate links and devices in the pipeline 100 should be determined, such as delays $\Delta t_1$-$\Delta t_5$ illustrated in FIG. 2.

Further, in some embodiments, some or all of the components 104, 110, 112, and 108 maintain a respective version of the grandmaster clock 120. During operation, these components continuously or periodically adjust the local versions of the grandmaster clock 120 using the latest calculated values of delays $\Delta t_1$-$\Delta t_5$. To this end, the components 102, 104, 110, 112, and 108 propagate the corresponding values downstream (in the direction of the arrow 130), upstream, or in both directions.

In general, when a component operating in the pipeline 100 determines a new value of a delay $\Delta t_1$-$\Delta t_5$, the component can communicate the new value to other components using any suitable messaging technique. For example, the component can adjust the time stamp in the packet 125, populate a field in the header of the packet 125 to indicate the length of the delay, transmit a separate message with the new value of the delay to one or more components operating in the pipeline 100, use combination of these techniques, etc.

With continued reference to FIG. 2, the packet source 102 and the wired communication unit 104 are coupled via a wired link 130 associated with propagation delay $\Delta t_1$, which in general is proportional to the length of the link 140. For example, the value of delay $\Delta t_1$ can be 500 nanoseconds or less. The wired link 140 is an Ethernet link, in an embodiment. Similarly, a wired link 140 can be an Ethernet link, and can introduce a delay $\Delta t_3$ of 500 nanoseconds or less. In an embodiment, the links 140 and 142 operate according to the IEEE 802.3af Standard. It is noted, however, that because the links 140 and 142 have different lengths, the values of delays $\Delta t_1$ and $\Delta t_3$ need not be the same.

On the other hand, the delay $\Delta t_2$ associated with the wired communication unit 104 can be significantly larger than the delays $\Delta t_1$ and $\Delta t_3$ (e.g., as long as 10 milliseconds). In an embodiment, the wired communication unit 104 is coupled to a processor 144, which can be a CPU, for example. In various scenarios, the data packet 125 can undergo processing at the hardware and/or software level. For example, the wired communication unit 104 and the processor 144 can operate in a network router that analyzes packets at multiple layers of the protocol stack and accordingly delays the packet 125 by a substantial amount of time.

In some embodiments, the wired communication unit 104 includes a clock 150. Although the clock 150 may not be synchronized with the grandmaster clock 120, the wired communication unit 104 can accurately and reliably determine the delay $\Delta t_3$ for the packet 125. To this end, the wired communication unit 104 generates a first time stamp upon arrival of the packet 125 at the wired communication unit 104 (e.g., as the packet 125 traverses the ingress pipeline of the corresponding inbound port) and a second time stamp just prior to transmission of the packet 125 via the communication link 142 (e.g., as the packet 125 traverses the egress pipeline of the corresponding outbound port). The time stamp can be simply the value of the register storing the current value of the clock counter maintained by the clock 150. Because the wired communication unit 104 generates the first and second timestamps using the same clock 150, the wired communication unit 104 can accurately determine the value of delay $\Delta t_2$ by subtracting the first time stamp from the second time stamp and multiplying the result by the frequency of the clock 150.

In general, propagation of timing information and/or synchronization between the packet source 102, the wired communication unit 104, and the wired communication unit 110, interconnected via Ethernet links 140 and 142, can be implemented using the IEEE 802.1AS and 802.3af standards. Using these techniques, the components 102, 104, and 110 can provide delay information to each other, adjust local versions of the grandmaster clock 120, etc.

Regarding the value of delay $\Delta t_4$ associated with the communication device 106, the communication units 110 and 112, and particularly the processor 116, can delay the packet 126 by a significant amount of time. To determine the value of delay $\Delta t_4$, the communication device 106 can implement the synchronization techniques of the present disclosure. Similar to the devices including the synchronization controller 40 discussed with reference to FIG. 1, the communication device 106 can implement transmission and capture of a periodic pulse or another signal between the communication units 110 and 112. Depending on the embodiment, the synchronization controller 119 causes a pulse to travel from the wired communication unit 110 to the wireless communication 112 or, conversely, from the wireless communication 112 to the wired communication unit 110. Suitable techniques for generating, capturing, and using these signals are discussed in more detail below with reference to FIG. 3.

The IEEE 802.11v Standard provides a mechanism for calculating the value of delay $\Delta t_5$ between the wireless communication units 112 and 108. In some implementations, the wireless communication unit 108 also utilizes this mechanism to synchronize its clock 152 with the clock 118B of the communication 112. More specifically, the communication units 112 and 108 can exchange "M1" and "M2" frames as defined by the 802.11v Standard. Using the M1 and M2 frames, the communication units 112 and 108 compute the delay $\Delta t_5$. The communication unit 108 can subtract $\Delta t_5$ from its version of the grandmaster clock 120 to match the version of the grandmaster clock 120 stored at the wireless communication unit 112.

Using the calculated values of the delays $\Delta t_1$-$\Delta t_5$ and/or the clock 152 synchronized with the grandmaster clock 120 (via the clock 118B in turn synchronized with the other clocks in the pipeline 100), a media processor 160 can properly process the data packet 125. For example, the media processor 160 can play back the audio or video content in the packet 125 at the correct time, as measured by the grandmaster clock 120.

Figure 3:
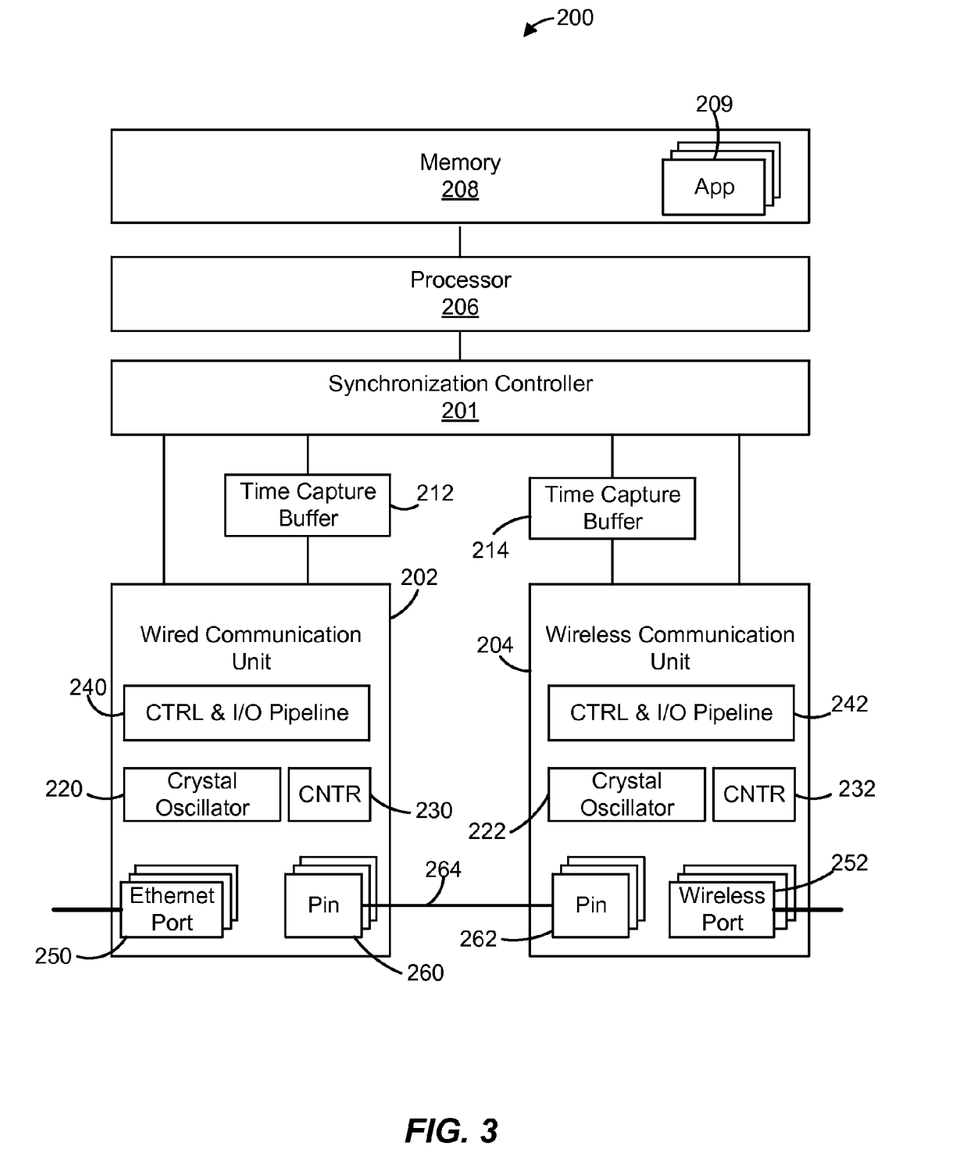
FIG. 3 is a block diagram of an example device that includes multiple communication units synchronized using one or more synchronization techniques of the present disclosure, according to an embodiment.

Now referring to FIG. 3, an example communication device 200 includes a synchronization controller 201 that synchronizes a wired communication unit 202 and a wireless communication unit 204 using a signal transmitted between the units 202 and 204, along with the respective representations of local time at the units 202 and 204. In an embodiment, the communication device 106 is generally similar to the communication device 200. Further, in some embodiments, the synchronization controller 201 and other components of the communication device 200 that implement synchronization between the communication units 202 and 204 define a TAI that is generally similar to the TAI 40 discussed with reference to FIG. 1. More generally, a device in which two or more processing units operate using separate clocks can be implemented similar to the communication device 200 to synchronize the processing units.

The communication device 200 in one embodiment also includes a processor 206, which can be a general-purpose CPU, an application-specific integrated circuit (ASIC), a programmable controller, etc. The processor 206 is coupled each of the communication units 202 and 204. In an embodiment, the processor 206 is configured to provide commands to the communication units 202 and 204 and receive status, control, and other information from the communication units 202 and 204. For example, the processor 206 may execute software instructions to perform high-level processing of data packets (e.g., deep inspection). In another embodiment, however, the communication device 200 does not include a processor 206 at all, and the communication units 202 and 204 directly implement the logic necessary to properly couple the communication units 202 and 204.

The communication device 200 also includes a computer-readable memory 208 coupled to the processor 208. The memory 208 can be any suitable persistent or transient memory, such as flash memory, a random access memory (RAM), a read-only memory (ROM), etc. The memory 208 stores one or several software applications 209. The memory 208 also can store data which the processor 206 generates and/or uses during operation.

According to some embodiments, the synchronization controller 201 and the wired communication unit 202 are coupled to a time capture buffer 212, and also the synchronization controller 201 and the wired communication unit 204 are coupled to a time capture buffer 214. The buffers 212 and 206 can be implemented as simple hardware registers, for example. As discussed below, the time capture buffers 212 and 214 store representations of local time for the units 202 and 204, respectively, corresponding to certain events, such as transmission or reception of a signal.

With continued reference to FIG. 3, the wired communication unit 202 includes a crystal oscillator circuit 220 that generates a periodic timing signal according to which the wired communication unit 202 operates. The wireless communication unit 204 includes a crystal oscillator circuit 222 that generates a periodic timing signal according to which the wireless communication unit 204 operates. In an embodiment, the crystal oscillator circuits 220 and 222 operate at different frequencies. Moreover, because the communication units 202 and 204 can be initialized or reset at different times, the crystal oscillator circuits 220 and 222 begin counting at different times, according to some scenarios. In other embodiments, the communication units 202 and 204 include other suitable types of clocks.

In an embodiment, the crystal oscillator circuit 220 increments a counter 230 by one for each cycle. Thus, the counter 230 stores the current representation of time as measured by the crystal oscillator circuit 220. Similarly, the crystal oscillator circuit 222 increments a counter 232 by one for each cycle, and the counter 232 stores the current representation of time as measured by the crystal oscillator circuit 222. Upon satisfying a certain condition, or in response to a command from the synchronization controller 201, the communication units 202 and 204 transfer the current values of the counters 230 and 232 to the time captures buffers 212 and 214, respectively. In some scenarios, the communication units 202 and 204 populate the respective buffers 212 and 214 with new values substantially at the same time. In other scenarios, the communication units 202 and 204 populate these buffers at different times in response to separate respective commands.

The wired communication unit 202 also includes a controller and an input/output pipeline 240. In an embodiment, the component 220 includes an ingress pipeline for processing an incoming data unit (e.g., a packet), a controller that implements protocol translation, routing, bridging, and/or other functions, and an egress pipeline for preparing a data unit for transmission. The wireless communication unit 204 includes a controller and an input/output pipeline 242 for processing incoming or outgoing data units transmitted via a wireless communication link.

The wired communication unit 202 includes of one or more Ethernet ports 250 to receive and/or transmit data packets, each including a set of contacts as specified by an appropriate communication protocol, according to an embodiment. In other embodiments, the wired communication unit 202 can additionally or alternatively include ports for other types of wired communications, including communication in accordance with proprietary standards. The wireless communication unit 204 includes a set of wireless ports 252, which in some embodiments may be virtual ports mapped to a same physical pipeline. The Ethernet ports 250 and the wireless ports 252 together define an external interface of the communication device 200.

Thus, the communication device 200 can receive a data packet via a wireless port, alter the data packet if necessary (e.g., by changing protocols or updating the header with new values), and transmit the data packet via an Ethernet port. In another scenario, the communication device 200 can receive a data packet via a wired port and transmit the data packet via a wired port.

According to one embodiment, the processor 206 defines an internal interface for exchanging data between the communication units 202 and 204. Thus, for example, when the wired communication unit 202 wishes to forward a data packet to the wireless communication unit 204, the processor 206 receives the data packet from the wired communication unit 202 and provides the data packet to the wireless communication unit 204. In another embodiment, the communication device 200 includes a direct interface between the communication units 202 and 204 for exchanging data packets.

Each of the wired communication unit 202 and the wireless communication unit 204 includes an available generic interface contact, such as a GPIO pin, in an embodiment. The communications units 202 and 204 can use these generic interface contact to transmit or receive synchronization signals. In the example of FIG. 3, the wired communication unit 202 includes a pin 260 coupled to a connector 264, and the wireless communication unit 204 includes a pin 262 coupled to the connector 264. The connector 264 is an example generic interface that provides a simple connection via which the communication unit 202 or 204 can transmit a pulse, for example. In other embodiments, the wired communication unit 202 and the wireless communication unit 204 communicate via a bus using Peripheral Component Interconnect Express (PCIE) or a Secure Digital Input Output (SDIS), for example. In any case, the connector 264 is a relatively simple, low-cost interface between the communications units 202 and 204. The components 260, 262, and 264 do not support synchronization according to the IEEE 802.1AS Standard, according to an embodiment.

In operation, the synchronization controller 201 directs one of the communication units 202 and 204 to transmit a pulse or another synchronization signal via the connector 264 to the other one of the communication units 202 and 204. The pulse in general travel in either direction between the communication units 202 and 204. As one example, the synchronization controller 201 designates the wired communication unit 202 as a source of the pulse. The synchronization controller 201 in this case causes the wired communication unit 202 to (i) transmit a pulse to the wireless communication 204 via the pin 260 (which is coupled to the connector 264) and (ii) record the current value of the counter 230 in the time capture buffer 212. The synchronization controller 201 further directs the wireless communication unit 204 to record the current value of the counter 232 in the time capture buffer 214. The synchronization controller 201 then subtracts the value stored in the time capture buffer 212 from the value stored in the time capture buffer 214 to generate an indication of time counter difference between the communication units 212 and 214, e.g., DC offset.

In at least some of the embodiments, the length of the connector 264 is sufficiently small for the synchronization controller 201 to consider the propagation delay of the pulse traveling via the connector 264 to be substantially zero. Accordingly, the synchronization controller 201 assumes the pulse arrives at the wireless communication 204 instantaneously, and directs the communication units 202 and 204 to record the corresponding counter values in the respective time capture buffers 212 and 214 at the same time.

In another embodiment, the synchronization controller 201 directs the wireless communication unit 204 to record the value of the counter 232 in the time capture buffer 214 only when the wireless communication unit 204 detects the pulse. In yet another embodiment, the synchronization controller 201 is configured to account for a constant propagation delay associated with the connector 264. When the synchronization controller 201 calculates the difference in values stored in the time capture buffers 212 and 214, the synchronization controller 201 applies the constant propagation delay to the difference as a correction factor.

In some embodiments, the synchronization controller 201 further calculates the PPM difference between the crystal oscillators 220 and 222. To this end, the synchronization controller 201 causes the communication unit designated as the source of the pulse to transmit the pulse periodically, e.g., at the rate of one pulse per second (PPS). In an embodiment, the pulse is transmitted at the beginning of the second.

Thus, in an example scenario, the synchronization controller 201 causes the wired communication unit 202 to transmit a pulse to the wireless communication unit 204 via the connector 264 at 12:00:00 am (according to the clock of the wired communication unit 202 or the processor 206, for example). The synchronization controller 201 calculates the DC offset using the corresponding values stored in the time capture buffers 212 and 214. For example, the time capture buffer 212 may store the value 0x3724 2817 and the time capture buffer 214 may store the value 0x0000 1278. The magnitude of the DC offset value accordingly is calculated as 0x3724 2817–0x0000 1278.

The synchronization controller 201 then causes the communication unit 204 to record transmit and receive times, respectively, for subsequent pulses to determine the PPM difference. For example, after one second, the value in the time capture buffer 212 can increase by twice as much as the value in the time capture buffer 214. Accordingly, the synchronization controller 201 can determine that the crystal oscillator 220 runs twice as fast as the crystal oscillator 222. After the synchronization controller 201 determines both the DC offset value and the PPM value, the communication device 200 can synchronize the communication device 202 and 204 and/or determine the propagation delay through the communication device 200.

In other embodiments, rather than causing the communication unit 202 or 204 to send a pulse via the connector 264 or a similar interface, the synchronization controller 201 utilizes messages transmitted between the communication unit 202 or 204 for other, non-synchronization purposes. For example, these messages can conform to a protocol for exchanging control information between the communication unit 202 and 204 that does not however provide a mechanism for synchronizing the communication units 202 and 204. The synchronization controller 201 can cause the wired communication unit 202 to record in the time capture buffer 212 the value of the counter 230 when the first symbol (e.g., bit) of the message is transmitted, and cause the wireless communication unit 204 to record in the time capture buffer 214 the value of the counter 232 when the first symbol of the message is received.

It is further noted that, although the synchronization controller 201 is depicted as a separate component in FIG. 3, the synchronization controller 201 in other embodiments is implemented as an integral part of another component of the communication device 200 or as several components operating within other components of the communication device 200. For example, in one such embodiment, the synchronization controller 201 and the processor 206 are implemented as a single integrated component. In another embodiment, the synchronization controller 201 is a component of the wired communication unit 202. In yet another embodiment, the synchronization controller 201 is a component of the wireless communication unit 204. Further, according to yet another embodiment, the synchronization controller 201 is implemented as software instructions stored in the memory 208 executable on the processor 206. Still further, in an embodiment, the synchronization controller 201 is implemented in a distributed manner as software instructions as well as one or more hardware components of the wired communication unit 202, the wireless communication 204, or both.

Several example methods which can be implemented in some of the devices discussed above are considered next.

Figure 4:
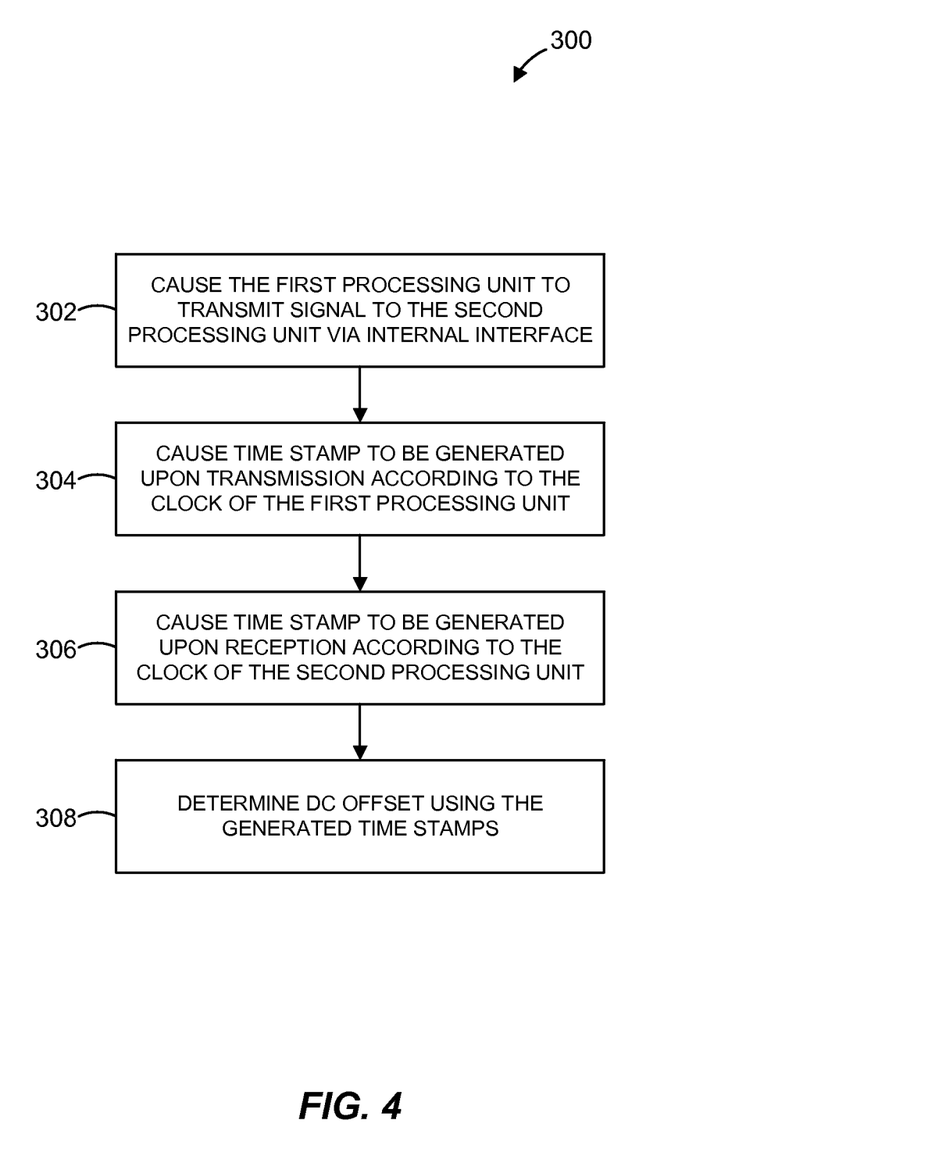
FIG. 4 is flow diagram of an example method for determining a difference between clocks of two processing units operating in the same device, according to an embodiment.

Referring first to FIG. 4, an example method 300 for determining a difference between clocks of two processing units can be implemented in the synchronization controller 201 of FIG. 3, for example, in which case the processing units are communication units. At block 302, the method 300 causes the first processing unit to transmit a signal to the second communication unit via internal interface. As discussed above, the internal interface can be a generic interface that implement such standards as IEEE 802.1AS, for example. As also discussed above, the transmitted signal can be a simple pulse, the beginning of a multi-symbol message, or any other type of signal.

Next, at block 304, a time stamp corresponding to the time when the signal was transmitted is generated using the clock of the first processing unit. At block 306, a time stamp corresponding to the time when the signal arrives at the second processing unit is generated using the clock of the second processing unit. In an embodiment, the reception of the signal is assumed to be unconditional and instantaneous, so that blocks 304 and 306 are executed substantially at the same time.

At block 308, DC offset is determined using the two generated time stamps. More generally, a difference in the values of the clocks of the processing unit is determined at block 308.

Figure 5:
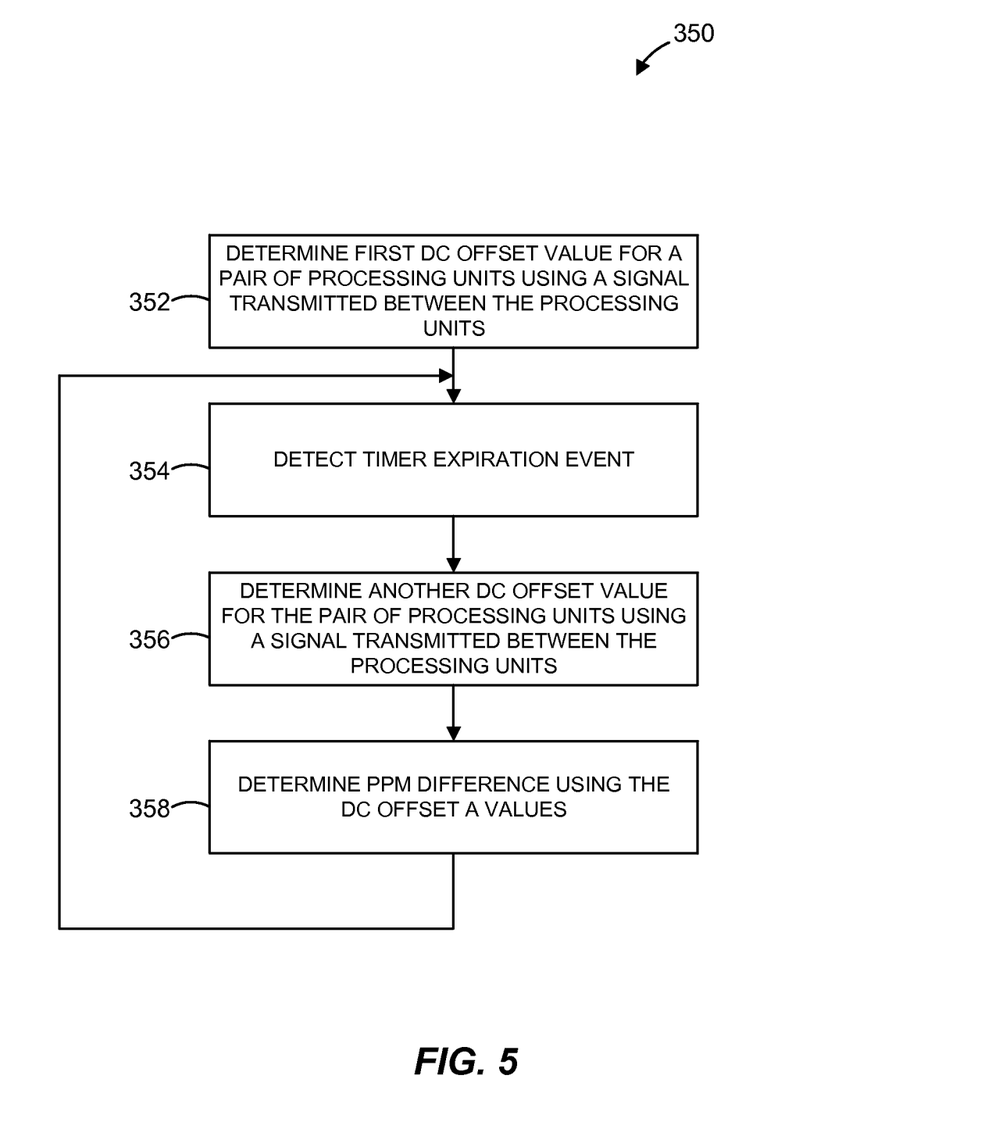
FIG. 5 is flow diagram of an example method for determining a difference in count frequencies between the clocks of two processing units operating in the same device, according to an embodiment.

FIG. 5 is flow diagram of an example method 350 for determining a difference in count frequencies between the clocks of two processing units operating in the same device. Similar to the method 300, the method 250 can be implemented in the synchronization controller 201, for example.

At block 352, a first DC offset value for a pair of processing units is calculated. To this end, the method 300 discussed above can be used, for example. Next, at block 354, a time expiration event is detected, and another DC offset value for the pair of processing devices is determined at block 356. The difference in count frequencies, such as a PPM value, is the determined at block 358 using the last calculated pair of DC offset values. The flow then returns to block 354 to await the next time expiration event. The time can be set to one second, for example. In this manner, the method 300 ensures that the DC offset and PPM values typically are accurate, even when one processing unit operating in a device is reset without the other processing unit operating in the same device being reset.

Figure 6A:
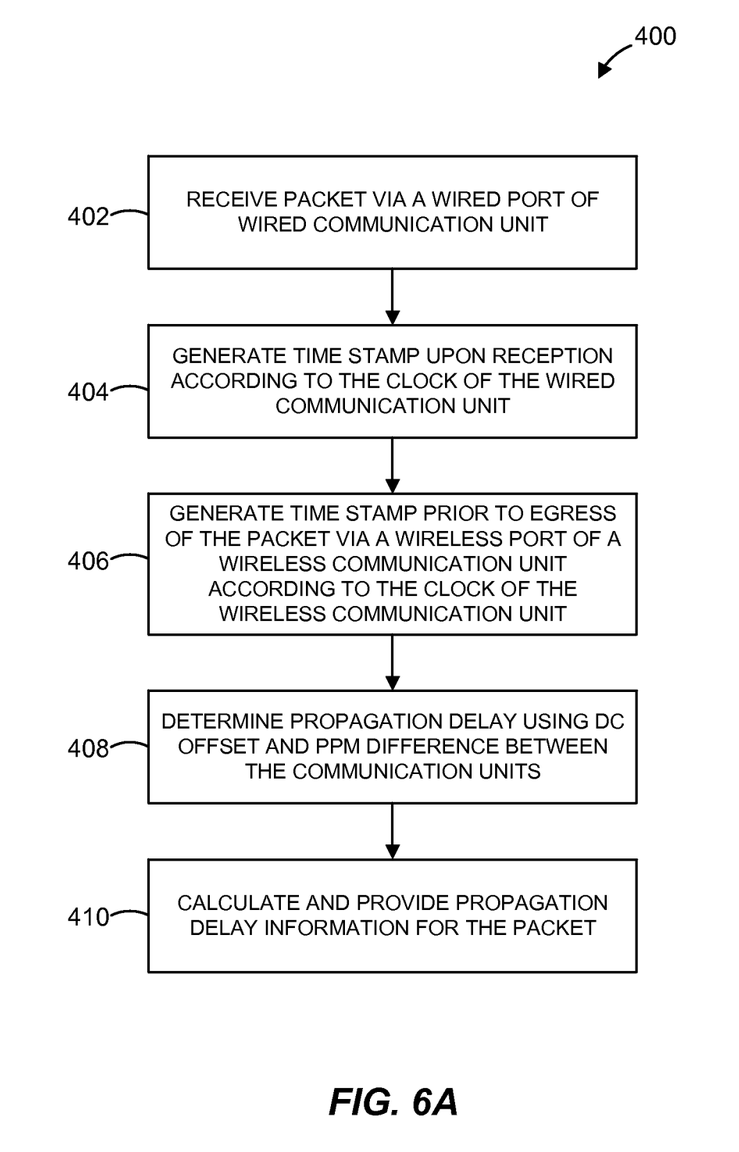
FIG. 6A is flow diagram of an example method for determining a propagation delay through a device including a wired communication unit and a wireless communication unit when a data unit arrives at the device via a wired port, according to an embodiment.

Now referring to FIG. 6A, an example method 400 for determining a propagation delay through a device including a wired communication unit and a wireless communication unit can be implemented in the communication device 200 of FIG. 3, for example. At block 402, a data packet is received via a wired port of a wired communication unit. The wired port can be an Ethernet port, for example.

A time stamp corresponding to the time when the data packet is received is generated at block 404. For example, in an embodiment, the time stamp is generated as the data packet travels through the ingress pipeline of the wired port.

At block 406, a time stamp is generated just prior to egress of the data packet via a wireless port of a wireless communication unit, according to the clock of the wireless communication unit. Because the wired communication unit and the wireless communication unit operate according to different clocks in such devices as the communication device 200, the DC offset and the PPM difference are determined at block 408. As one example, the methods 300 and 350 discussed above can be used.

Next, the propagation delay through the device is calculated at block 410. Propagation delay information is then provided for the data packet for subsequent processing at other communication devices. Depending on the embodiment, the propagation delay can be specified as a field in the packet, as a separate message, or in any other suitable manner. Using the propagation delay information, a subsequent receiver of the packet can play back the data in the data packet (or otherwise process the data packet) at the proper time.

Figure 6B:
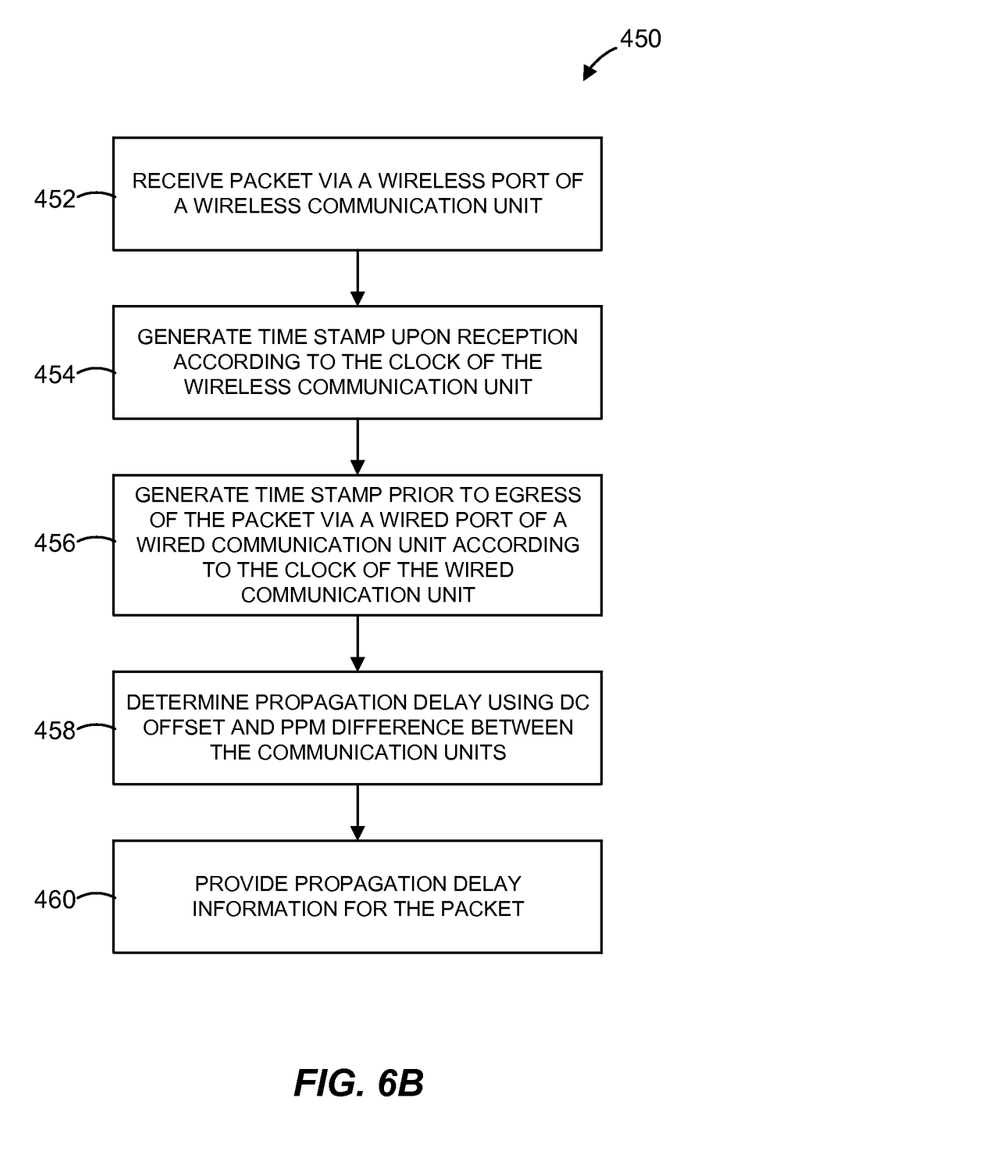
FIG. 6B is flow diagram of an example method for determining a propagation delay through a device including a wired communication unit and a wireless communication unit when a data unit arrives at the device via a wireless port, according to an embodiment.

FIG. 6B illustrates a method 450 that is generally similar to the method 400, except that the packet is received at a wireless port of a wireless communication unit (452). Accordingly, the time stamp corresponding to the reception of the data packet is generated according to the clock of the wireless data unit (block 454), and the time stamp corresponding to the imminent departure of the data packet is generated according to the clock of the wired communication unit (block 456). Blocks 458 and 460 are similar to blocks 408 and 410 discussed above.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a RAM, a ROM, a flash memory, etc. The software or firmware instructions may include machine readable instructions that, when executed by the processor, cause the processor to perform various acts.

When implemented in hardware, the hardware may comprise one or more of discrete components, an integrated circuit, an ASIC, a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. An apparatus comprising:
a first processing unit operating according to a first clock;
a second processing unit operating according to a second clock running separately from the first clock;
a data interface for exchanging data packets between the first processing unit and the second processing unit;
a generic interface, separate from the data interface, for exchanging signals between the first processing unit and the second processing unit;
a synchronization controller coupled to the first processing unit and the second processing unit, wherein the synchronization controller is implemented on an integrated circuit and is configured to
(i) cause the first processing unit to generate a first indication of time at which the first processing unit transmits a signal to the second processing unit via the generic interface, according to the first clock,
(ii) cause the second processing unit to generate a second indication of time at which the second processing unit receives the signal, according to the second clock,
(iii) determine an offset between the first clock and the second clock based on the first indication of time and the second indication of time, and
(iv) determine a propagation delay associated with data packets exchanged via the data interface using the determined offset.

2. The apparatus of claim 1, wherein the generic interface includes one of (i) a General Purpose Input/Output (GPIO) pin, (ii) a Peripheral Component Interconnect Express (PCIE) port, or (iii) a Secure Digital Input Output (SDIS) slot.

3. The apparatus of claim 1, wherein the signal is a pulse.

4. The apparatus of claim 1, wherein the synchronization controller is configured to periodically repeat operations (i) and (ii) to determine a difference in frequency between the first clock and the second clock.

5. The apparatus of claim 1, wherein:
the first processing unit is one of (i) a wired communication unit configured to receive and transmit data via a wired communication link and (ii) a wireless communication unit configured to receive and transmit data via a wireless communication link, and
the second processing unit is the other one of the wired communication unit and the wireless communication unit,
wherein the apparatus is configured to forward data between the wired communication unit and the wireless communication unit.

6. The apparatus of claim 5, wherein the wired communication link is an Ethernet link.

7. The apparatus of claim 1, further comprising:
a first hardware register coupled to the first processing unit and to the synchronization controller to store the first indication of time; and
a second hardware register coupled to the second processing unit and to the synchronization controller to store the second indication of time.

8. A synchronization method in a device that includes (i) a first processing unit operating according to a first clock and (ii) a second processing unit operating according to a second clock running separately from the first clock, the method comprising:
causing the first processing unit to generate a first indication of time at which the first processing unit transmits a signal to the second processing unit via a generic interface, according to the first clock;

causing the second processing unit to generate a second indication of time at which the second processing unit receives the signal, according to the second clock, determining an offset between the first clock and the second clock based on the first indication of time and the second indication of time;

determining a propagation delay associated with the device for data packets exchanged via a data interface using the determined offset, wherein the data interface is i) separate from the generic interface, and ii) between the first processing unit and the second processing unit.

9. The method of claim 8, further comprising causing the first processing unit to transmit the signal via the generic interface, wherein the generic interface is one of (i) a General Purpose Input/Output (GPIO) pin, (ii) a Peripheral Component Interconnect Express (PCIE) port, or (iii) a Secure Digital Input Output (SDIS) slot.

10. The method of claim 8, further comprising causing the first processing unit to transmit the signal in the form of a pulse.

11. The method of claim 8, wherein the signal is associated with a command transmitted between the first processing unit and the second processing unit, wherein the command conforms to a messaging protocol defined for exchanging control information between the first processing unit and the second processing unit.

12. The method of claim 8, further comprising:
causing the first processing unit to generate the signal as one of a plurality of signals;
generating multiple versions of the first indication of time and the second indication of time using the plurality of signals; and
determining a difference in frequency between the first clock and the second clock based on the multiple versions of the first indication of time and the second indication of time.

13. The method of claim 12, wherein the first processing unit is a first communication unit and the second processing unit is a second communication unit, the method further comprising:
receiving a data packet via a port of the first communication unit;
determining the propagation delay associated with the device using the determined offset and the determined difference in frequency; and
transmitting the data packet via a port of the second communication unit, including providing an indication of the propagation delay.

14. The method of claim 13, wherein the first communication unit is one of a wired communication unit and a wireless communication unit, and the second communication unit is the other of the wired communication unit and the wireless communication unit.

15. A communication device, comprising:
a first processing unit,
a second processing unit,
a synchronization controller coupled to the first processing unit and the second processing unit, wherein the synchronization controller is implemented on an integrated circuit,
a data interface for exchanging data packets between the first processing unit and the second processing unit, and
a generic interface, separate from the data interface, via which the first processing unit is coupled to the second processing unit;
wherein the first processing unit comprises a first clock according to which the first processing unit operates;
wherein the second processing unit comprises a second clock running separately from the first clock and according to which the second processing unit operates; and
wherein the first processing unit is configured to (i) transmit a periodic signal to the second processing unit via the generic interface, and (ii) generate a first indication of time at which the first processing unit transmits the periodic signal to the second processing unit, according to the first clock,
wherein the synchronization controller is configured to (i) cause the second processing unit to generate a second indication of time at which the second processing unit receives the periodic signal, according to the second clock, (ii) generate a synchronization parameter based on the first indication of time and the second indication of time, and (iii) determine a propagation delay associated with data packets exchanged via the data interface using the synchronization parameter.

16. The processing unit of claim 15, wherein the generic interface includes one of (i) a General Purpose Input/Output (GPIO) pin, (ii) a Peripheral Component Interconnect Express (PCIE) port, or (iii) a Secure Digital Input Output (SDIS) slot.

17. The processing unit of claim 15, wherein the periodic signal is a pulse.

18. The processing unit of claim 15, wherein the synchronization parameter includes at least one of (i) an offset between the first clock of the first processing unit and the second clock of the second processing unit and (ii) a difference in frequency between the first clock of the first processing unit and the second clock of the second processing unit.

19. The processing unit of claim 15, wherein:
the first processing unit is one of (i) a wired communication unit configured to receive and transmit data via a wired communication link and (ii) a wireless communication unit configured to receive and transmit data via a wireless communication link; and
the second processing unit is the other one of the wired communication unit and the wireless communication unit.

* * * * *